United States Patent
Moroney et al.

(10) Patent No.: US 11,630,883 B2
(45) Date of Patent: Apr. 18, 2023

(54) THREAT CONTROL AND PREVENTION FOR ANDROID SYSTEMS

(71) Applicant: ARRIS Enterprises LLC, Suwanee, GA (US)

(72) Inventors: Paul Moroney, La Jolla, CA (US); Cesar A. Moreno, Snellville, GA (US); Gopalkrishna V. Mudaliar, San Diego, CA (US); Arpan Kumar Kaushal, Ottawa (CA)

(73) Assignee: ARRIS Enterprises LLC, Suwanee, GA (US)

( * ) Notice: Subject to any disclaimer, the term of this patent is extended or adjusted under 35 U.S.C. 154(b) by 235 days.

(21) Appl. No.: 16/404,548

(22) Filed: May 6, 2019

(65) Prior Publication Data

US 2019/0340339 A1 Nov. 7, 2019

Related U.S. Application Data

(60) Provisional application No. 62/667,531, filed on May 6, 2018.

(51) Int. Cl.
*G06F 21/12* (2013.01)
*G06F 8/61* (2018.01)
*G06F 21/56* (2013.01)

(52) U.S. Cl.
CPC ............ *G06F 21/123* (2013.01); *G06F 8/62* (2013.01); *G06F 21/565* (2013.01);
(Continued)

(58) Field of Classification Search
CPC .... G06F 21/123; G06F 21/565; G06F 21/566; G06F 8/62; G06F 2221/033; G06F 2221/0704
See application file for complete search history.

(56) References Cited

U.S. PATENT DOCUMENTS 8,850,579 B1 9/2014 Kalinichenko
2009/0313665 A1* 12/2009 Rouse ................ H04N 21/8352
725/93

(Continued)

OTHER PUBLICATIONS

PCT International Search Report & Written Opinion, RE: Application No. PCT/US2019/030968, dated Aug. 26, 2019.
(Continued)

*Primary Examiner* — Ashokkumar B Patel
*Assistant Examiner* — William B Jones
(74) *Attorney, Agent, or Firm* — Panitch Schwarze Belisario & Nadel LLC

(57) ABSTRACT

A method is provided that determines whether to allow an application (app) for use or restrict the app on a set top box (STB). The method includes the steps of measuring at the STB, one or more resources used by the app; comparing at the STB, one or more thresholds set by an operator; and determining if the one or more resources used by the app exceed one or more thresholds set by the operator. Another method is provided that monitors applications (apps) that are installed a set top box (STB) for illegal or harmful activity by a policy manager. This method includes downloading and copying an app from an external source; installing or uninstalling the app into an application folder; providing a notification informing the policy manager of the installing or uninstalling of the app; and evaluating the app be installed or uninstalled.

22 Claims, 8 Drawing Sheets

(52) U.S. Cl.
CPC ...... *G06F 21/566* (2013.01); *G06F 2221/033* (2013.01); *G06F 2221/0704* (2013.01)

(56) References Cited

U.S. PATENT DOCUMENTS

| | | | |
|---|---|---|---|
| 2012/0144418 A1* | 6/2012 | Morris | H04N 21/4333 |
| | | | 725/32 |
| 2013/0205366 A1 | 8/2013 | Luna et al. | |
| 2014/0242945 A1 | 8/2014 | Zeng et al. | |
| 2015/0074259 A1* | 3/2015 | Ansari | H04L 12/2834 |
| | | | 709/224 |
| 2016/0125184 A1 | 5/2016 | Mahaffey et al. | |
| 2016/0378578 A1 | 12/2016 | Nandakumar | |
| 2016/0378989 A1 | 12/2016 | Park | |
| 2017/0244988 A1* | 8/2017 | Hasek | H04N 21/23113 |
| 2017/0272783 A1* | 9/2017 | Bachmutsky | H04N 21/632 |

OTHER PUBLICATIONS

I. Veljko, et al., "One implementation of multimedia content presentation for the Andriod-based set-top box", 2013 IEEE 3rd International Conference on Consumer Electronics, Sep. 9, 2013, pp. 1-3.

* cited by examiner

THREAT CONTROL AND PREVENTION FOR ANDROID SYSTEMS

CROSS-REFERENCE TO RELATED APPLICATIONS

This application claims the benefit of priority to U.S. Patent Application No. 62/667,531, entitled "Operator Android STB and App Control," filed on May 6, 2018, which is hereby incorporated by reference in its entirety.

FIELD

This disclosure relates to communication security, and more particularly, to a method and system for monitoring an application in an Android operating system.

BACKGROUND

Mobile devices, such as smart phones and tablet computers, have become a main platform for development of various applications and provide the basis for mobile software and Internet industries. With the development of the mobile communication industry, users of mobile devices now have more freedom in selection and installation of application software, such that user experiences provided by the mobile devices will better satisfy the requirement of user personalization.

However, in a mobile application system, it is inevitable that a user may be provided with virus programs or malicious software containing virus programs, in addition to non-malicious mobile application software. In contrast to desktop operating systems for conventional personal computers, in a mobile application platform, such as a Google Android operating system, its system kernel is locked or it is very difficult for developers or operators to monitor and control operations of other applications using traditional virus detection techniques.

Alternatively, a user may knowingly download one or more applications not permitted by the operator. For example. Google Android for Operators is now getting close to something operators would like to deploy. However, Google insists on direct access to the Google Play store, without any blacklist of application downloads like Kodi, etc., and operators do not want open access.

Systems and methods that allow operators or service providers to monitor applications that are installed on the Android device and to take action if an illegal or harmful application is discovered would be highly desirable. Accordingly, such systems and methods are disclosed herein.

SUMMARY

In accordance with one aspect of the invention, a method of determining whether to allow an application (app) for use or restrict the app on a set top box (STB) is provided. The method includes the steps of measuring at the STB, one or more resources used by the app; comparing at the STB, one or more thresholds set by an operator; and determining if the one or more resources used by the app exceed one or more thresholds set by the operator.

In accordance with one aspect of the invention, a method of monitoring applications (apps) that are installed a set top box (STB) for illegal or harmful activity by a policy manager is provided. The method includes downloading and copying an app from an external source; installing or uninstalling the app into an application folder; providing a notification informing the policy manager of the installing or uninstalling of the app; and evaluating the app be installed or uninstalled.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

An example embodiment of the present invention and its potential advantages are best understood by referring to FIGS. 1-8 of the drawings, like numerals being used for like and corresponding parts of the various drawings. The FIGS. 1-8, discussed below, and the various embodiments used to describe the principles of the present disclosure are by way of illustration only and should not be construed in any way to limiting the scope of the disclosure. Those skilled in the art will understand the principles of the present disclosure may be implemented in any suitably arranged mobile communication device, server and clients.

As provided above, Google Android for Operators is now getting close to something operators would like to deploy. However, Google insists on direct access to the Google Play store, without blacklisting of application downloads or "apps" like Kodi, etc. that allow pirated software to be used, e.g., via add-ons, and operators do not want open access. Instead of blacklisting downloads of apps, provided herein are methods and systems that allow any Play Store download as per Google requirements, but which determine which apps should be excluded from or restricted in use. For example, a server in the operator infrastructure or elsewhere, that has full information on the "good" or "allowable" apps operators approve or prefer for use, and the restrictions for doing so, may be used. This list of "allowable" apps may be updated from time to time.

In some embodiments, apps can be identified or labeled as "OK" for use, or general characteristics or parameters can be specified for a real-time agent provided e.g., running inside a set top box (STB). The agent can measure bandwidth consumed by an app, actual memory consumed, percentage memory consumed (e.g., flash and/or DRAM), CPU usage, and features of the platform that are accessed by the app. Any of these parameters can be set with thresholds to exclude an app, for example, options for exclusion may include: (1) No infrastructure or network IP access, upstream or downstream; (2) Infrastructure or network IP access at reduced bit rates; (3) Access blocked to specific domains or IP addresses; (4) No load at next load time; (5) No access to specific STB features, such as writing flash memory, use of the display, etc.; (6) Warning messages, with user prompt to allow operation under some or no conditions. As an example, a user may download an app, the agent contacts a server, gets all the information and thresholds, and then presents a message if so specified. This has some similarity to virus and spam detection, but is highly specific to an operator's intent. Fortunately, apps on the Google play store are already 'approved' in some sense by Google.

Figure 1:
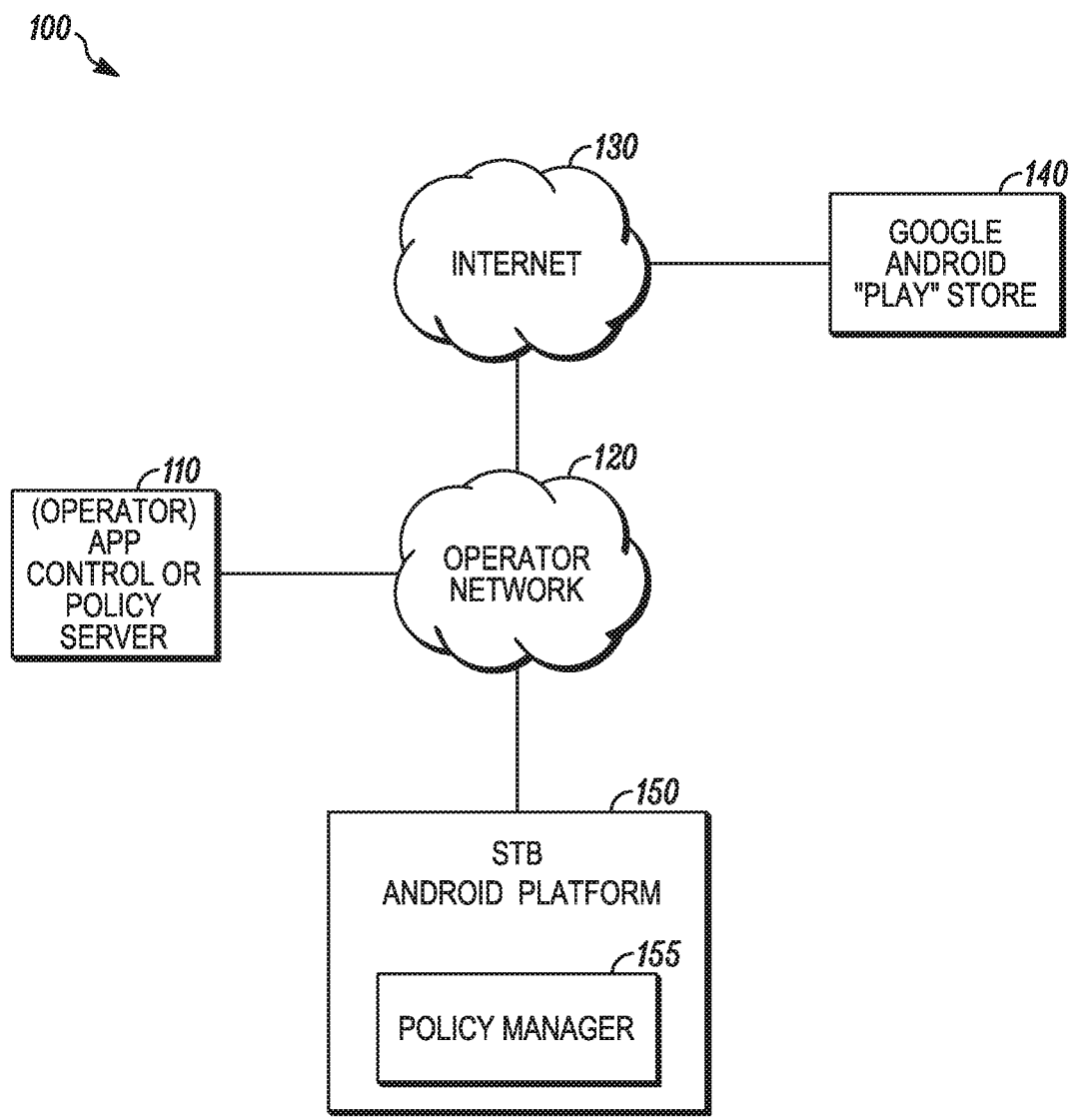
FIG. 1 is a high level diagram depicting an embodiment of a system that can be used for determining which apps should be excluded from or restricted in use.

FIG. 1 is a high-level diagram depicting an embodiment of a system 100 that can be used for determining which apps should be excluded from or restricted in use. System 100 includes an app control or policy server 110 (e.g., an operator server), an operator network 120, Internet 130, Google Android Play Store 140, and set top box (STB) 150, with a policy manager 155. As used herein, an operator refers to a cable MSO, and telco operator, or a satellite broadcast operator. Consequently, an operator network 120 is the access network by which that operator supports his customers (e.g. cable, DSL, fiber, satellite).

In some embodiments, App control or policy server 110 includes a list of apps, where an operator sets an acceptable use of platform resources or network resources. The operator may determine through experience with different applications just how those applications may affect his network, provide avenues to steal proprietary content, or enable such, and even perhaps leak personal data of the customer. Application behavior becomes fairly well known over time, given the very broad deployment of the Android system in general, and the vast number of applications available through the Google play store.

For a STB 150 with the "Android for Operators" installed as an application platform, consumers are free to browse the Google play store 140, located on the Internet 130, and choose any application at all. While Google has assured some aspects of these applications, they cannot assure that all these applications are intended to run in the best interests of the operators, in all respects. Any application chosen by the consumer would then download through the operator network 120 to the STB 150 in the consumer's home. This application is then installed and available for use, despite any negative or undesirable aspects of that use. Policy server 110 contains information about the best use of these applications, within the context of an operator provided service, as compiled by the operator based upon experience and interactions with content providers, etc. Policy manager 155 within the STB interacts with the Android platform and the policy server 110 to observe the applications as they run, measure their use of STB and system resources, and then provide controls and mitigations to any misuse as defined by the policy server 110.

Figure 2:
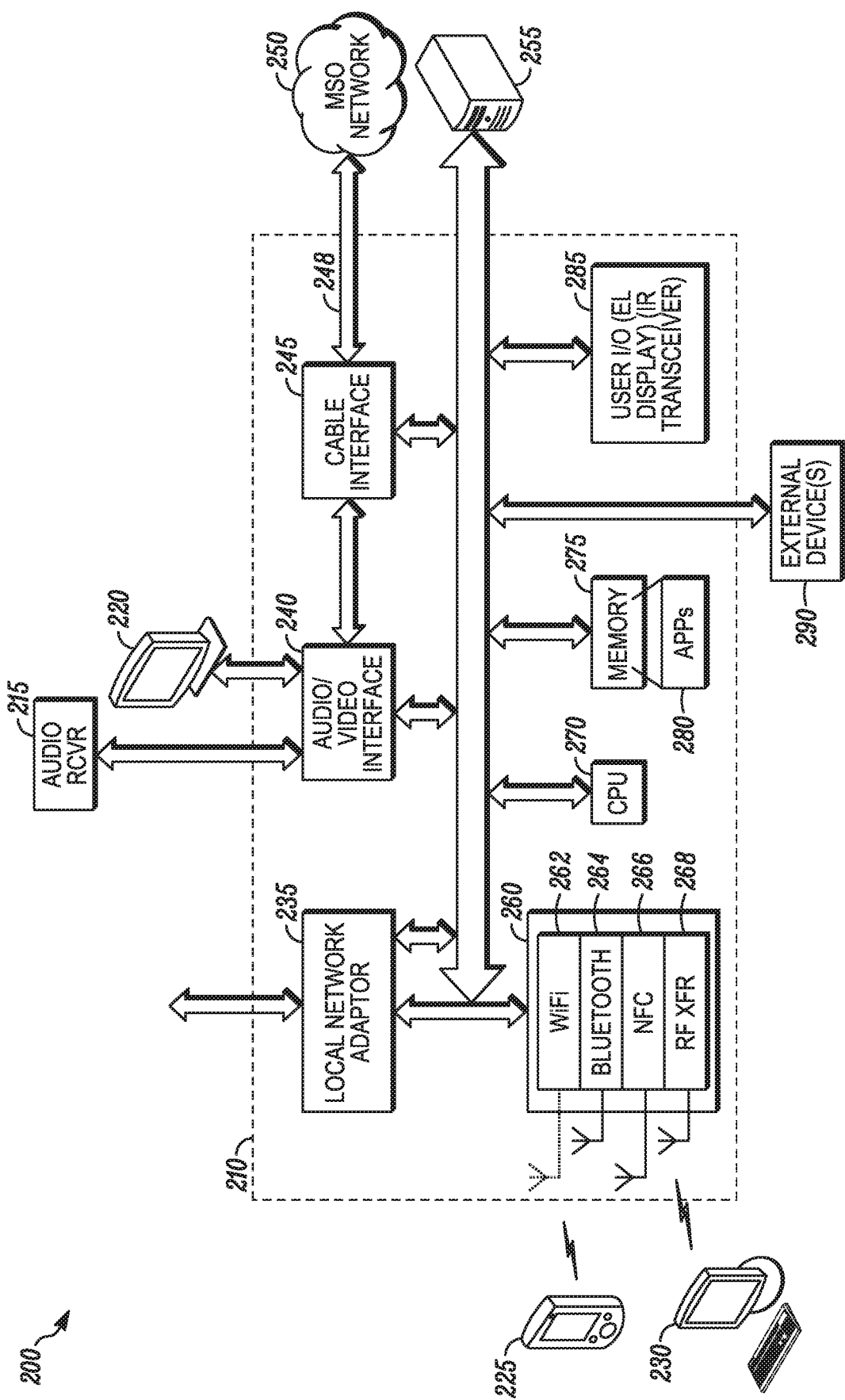
FIG. 2 illustrates a more detailed block diagram of an example set top box (STB)

FIG. 2 illustrates a more detailed block diagram of an example STB 210 in a network 200. The example STB 210 includes an audio video interface 240 for processing data, e.g. decoding an MPEG or HEVC video stream to output visual content for display on display device 220 and to stream audio content to display device 220 and/or audio receiver 215. The STB 210 also includes an interface for local communication with consumer premises equipment (CPE) devices, and in this example, that interface takes the form of a local network adapter 235 which includes a wired/optical communication port as well as wireless ports 260 to Wi-Fi transceiver 262, Bluetooth transceiver 264, NFC transceiver 266 and an RF transceiver (labeled "RF XFR") 268, such as a ZigBee RF4CE transceiver. In this example, Wi-Fi transceiver 262 may be a Wi-Fi access point.

The STB 210 also includes cable interface 245 for receiving programming and Internet protocol (IP) packets from an edge serving office (ESO) (not shown). An ESO may be a headend or central office of a multiple service provider (MSO) 250, such as a cable, satellite, or telco (telephone company). The IP packets may, for example, include HEVC streams, encapsulated MPEG transport streams, Windows Media streams or other audio/video streaming data. The video data received and processed by the STB 210 is collectively referred to herein as video streams. These streams may include MPEG transport streams from the cable interface 245, IP encapsulated MPEG or HEVC transport streams from the MSO 250 ESO, HEVC video streams, Windows Media video streams or other streaming video data. The circuitry of the audio video interface 240 may include circuitry that decodes selected video streams to send decoded video data to the display device 220.

The MSO network 250 may be coupled to a cable input line 248 of the STB 210. In instances where the MSO 250 delivers a number of channels of content, such as sports channels, cooking show channels, history-related channels, premium movie channels, public service channels, traditional television network channels and the like, a viewer/user may select to view the different channels via the first source I/O terminal 285 of the STB 210. The cable interface 245 may also send and receive data over the MSO network 250 to/from an ESO-associated server (not shown) and/or a content server (not shown) to obtain media content and possibly meta-data files or meta-data related instructions from the ESO server. In addition to the MSO network 250 sources of content, other sources of content include external devices 290, computer 230 or the like of as other sources of content available through the cable input line 248.

The STB 210 also includes circuits forming one or more processors to implement a CPU 270 and memory 275 for controlling operations of the STB 210. The example STB 280 is connected to the network attached storage (NAS) device 255 for storing data, such as, for example, user preference information, media content and meta-data files downloaded via the MSO network 250, and the like. The memory 275 may include one or more memories and/or other program and data storage devices, for example, for storing instructions executable by the CPU 270. The memory 275 may also include program instructions, such as applications (Apps) 280, user preference information, associated mobile device information, and the like.

The example STB 210 also includes a user I/O interface 285. The user I/O interface 285 may include an electroluminescent (EL), liquid crystal device (LCD), or light emitting diode (LED) display for displaying information to the user watching the display device 220. The user I/O interface 285 may also include an infrared (IR) receiver for receiving instructions from a user's remote control (not shown). Although not shown in detail, this IR receiver may be implemented as an IR transceiver and provide a communication channel for sending and receiving short-range optical communications between the STB 210 and one or more of the CPE devices 255, 220, 215, 290, 225, 230.

Returning briefly to FIG. 1, as explained above, some apps from Google Android Play Store 140 are not in the best interests of the operator or consumer (e.g., user). The apps may include, for example: (1) piracy related apps, like Kodi;

(2) apps that consume too many resources in platform or network; (3) apps that expose sensitive consumer data.

As to how an operator decides what choices to make in controlling the policy manager in the STB for each app, the operator can do whatever makes sense for his consumer and network. For example, by installing add-ons to one known app, the Kodi app, the consumer can search the internet for free television programs and movies, even ones that someone has stolen; thus Kodi can be thought of as a pirate assist app.

Google will not let the operator block that app if the operator signs up to use Google's Android operating system on the box. Of course, the operator could complain to Google, but that is of little to no help. So what can an operator do? The operator should be able to control his own equipment, such as the rented STB, and his own network.

Because Kodi is used to steal content (e.g., steal content or view stolen content), the operator could set the policy manager to have the STB output only Standard Definition content, not HD or 4K, or limit the network bandwidth consumption to low amounts. These sorts of measures do not kill the app, which Google would object to, but they do make the usefulness far lower by implementing thresholds.

Figure 3:
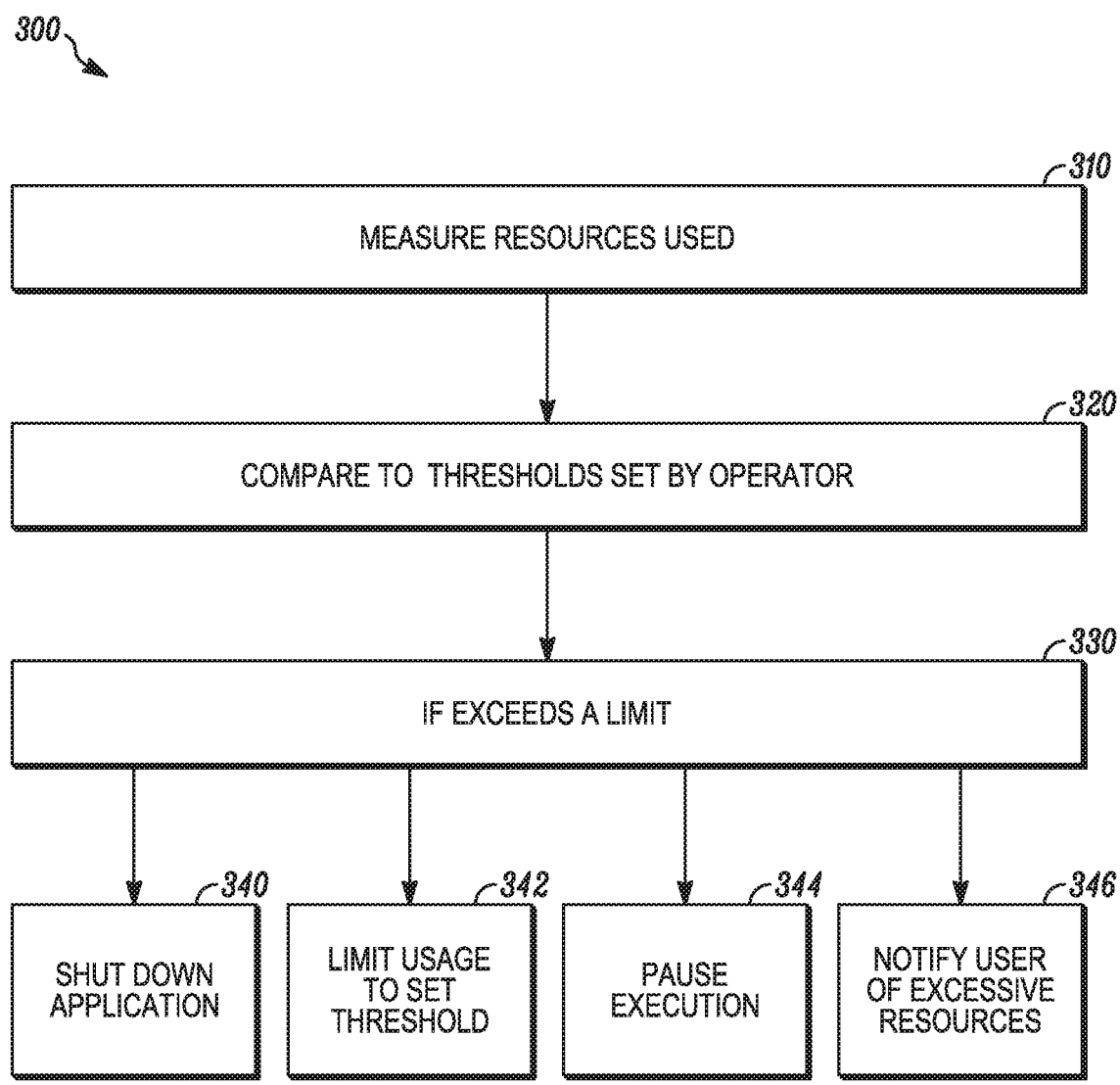
FIG. 3 is a general flow chart illustrating a process that a policy manager may implement.

FIG. 3 is a general flow chart illustrating a process 300 that a policy manager may implement. At step 310, the policy manager measures resources used by a running application. Some resources measured may include, for example: upstream bandwidth, downstream bandwidth, memory on platform (RAM), memory on platform (FLASH), CPU utilization, display resolution (HD or SD).

At step 320, the policy manager compares the resources used against thresholds set by an operator at e.g., an app control or policy server.

At step 330, the policy manager determines if the resources used exceeds a threshold or limit. In some embodiments, if a threshold is exceeded, at step 340, the policy manager shuts down the application. In some embodiments, if a threshold is exceeded, at step 342, the policy manager limits the usage for the application to the set threshold. In some embodiments, if a threshold is exceeded, at step 344, the policy manager pauses execution of the application for some time period, such as one second or more. This would allow other applications to run more efficiently.

In some embodiments, if a threshold is exceeded, at step 346, the policy manager notifies the user of excessive resources used by the application. As an example, if an application exposes sensitive or private data, the policy manager may display a warning to the user.

In addition to determining if apps should be excluded from use by referencing parameters set with particular thresholds or simply referencing if an app is on a blacklist, other methods are also contemplated within this disclosure. For example, in a traditional set top box (STB) implementation in a home environment, the software is a closed system where a service provider and STB provider has control of all the software running in the STB. Unlike a traditional STB, an AndroidTV STB product is an open system where users can download and install any number of third party applications or apps, some of which may not be trusted or qualified by Google. Some of these applications may be illegal or harmful to the STB and expose the service provider to liability, revenue loss, or negative publicity.

Provided herein are systems and methods that allow for monitoring applications that are installed in the AndroidTV STB and enable a service provider to take action if an illegal or harmful application is discovered. In some embodiments, file monitoring and scanning, similar to a virus scanner, may be implemented to identify malicious packages, files, or other content deemed to be outside the usage policies established by an OEM and operator.

In some embodiments, a service provider may define a policy in a service level agreement with the subscriber of the types of applications that the user is not allowed to install. Based on this policy, the service provider can remotely take action to stop or delete disallowed applications installed on the user's AndroidTV STB by including, for example: (1) a policy database that defines the specific applications or type of applications that are disallowed; (2) a monitoring function that compares the installed applications against the policy database; (3) a notification function to notify the service provider that a disallowed application is installed on a user's STB; (4) a control function that enables the service provider to stop or delete a disallowed application; (5) a notification function that notifies the user that a service provider action has occurred.

Figure 4:
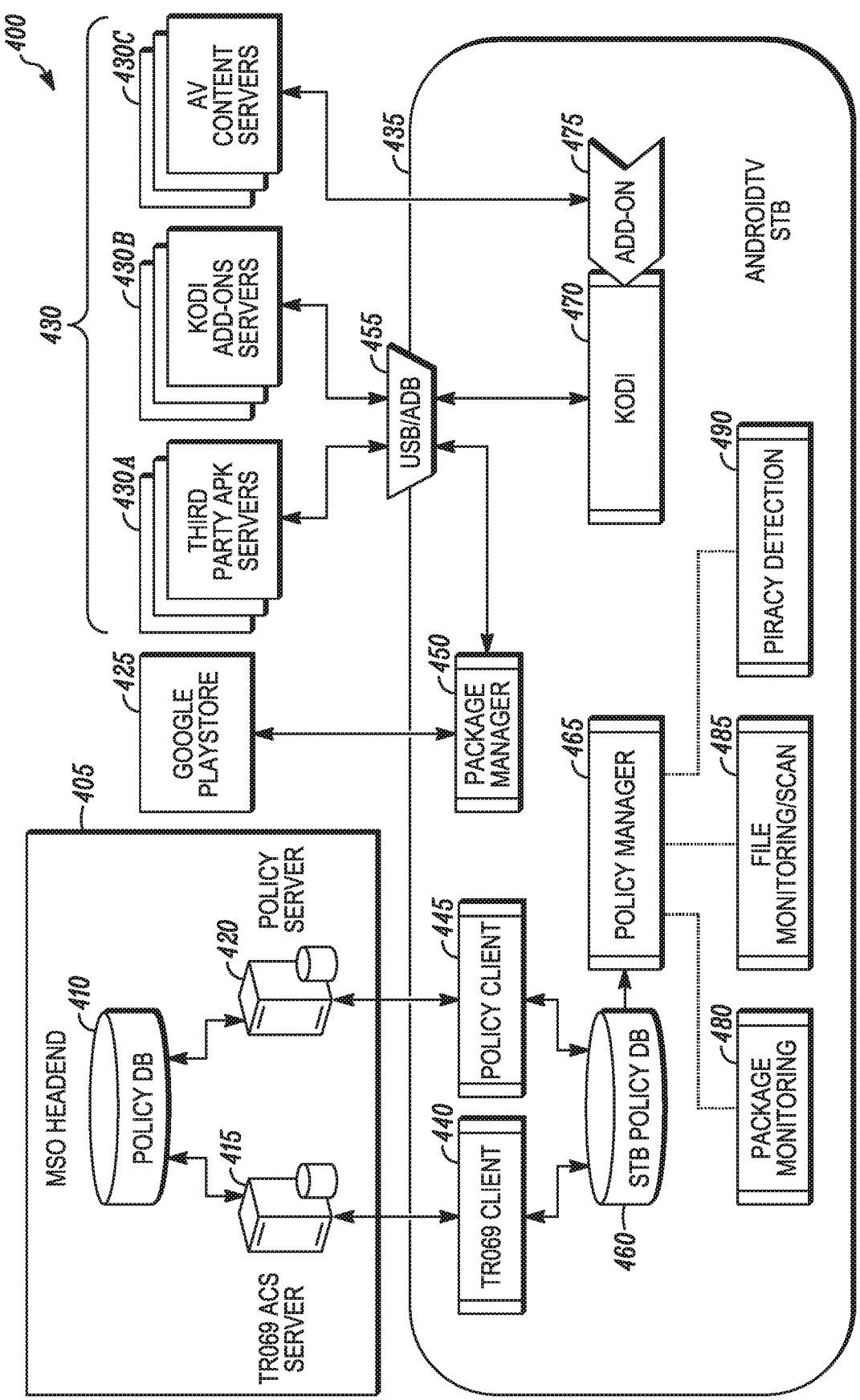
FIG. 4 illustrates a partial block diagram of an exemplary system or server that may be used to carry out methods and processes of the disclosure.

FIG. 4 is a block diagram of a system 400 for implementing embodiments of the present disclosure. System 400 includes an MSO Headend 405 and an Android STB 435, along with optional Google Play Store 425 and one or more third-party internet servers 430.

As is appreciated, Google Play Store 425 is a Google owned and operated application distribution service serving APKs to authorized android devices. One or more servers 430 may include, for example, third party APK servers 430a, add-on servers 430b, and AV content servers 430c. Third-party APK servers 430a may include any server other than the Google Play store serving application apks. The access to these servers 430a may or may not be authorized. Add-on servers 430b may include servers hosting add-ons for Android applications such as Kodi. The add-ons may come in different forms, for example, apks or simple archives such as zip. AV content servers 430c may include various third party servers hosting illegal and pirated AV content.

In some embodiments, MSO Headend 405 may be configured as a master facility hosting backend equipment used in controlling set top devices and delivering content. MSO Headend 405 may include policy database 410, an auto configuration server 415 and a policy server 420. Policy database 410 may be configured as a database storing policies on how to detect and react to nefarious applications and illegal content. Auto configuration server 415 may be configured as a server for remote management and control of set top devices and other consumer electronics, such as gateway routers, TVs, mobile phones, etc. Policy server 420 may be configured as a simple http-based server to retrieve policies off policy database 410.

In some embodiments, STB 435 can retrieve the policies off policy server 420 or may get policies via a push from auto configuration server 415. In other embodiments, policies may get delivered to the STB via other server client architectures or via policy configuration packaged within an archive or an android application APK or a build-time configuration placing the policy within the Android system image.

In some embodiments, Android STB 435 includes an auto configuration client 440, a policy client 445, a package manager 450, a USB/ADB 455, a STB policy database 460, a policy manager 465, an app with illegal content 470, and an add-on 475. Android STB 435 may be a set top box running an Android operating system. Auto configuration client 440 may be a TR069 client, for example, that connects to a TR069 auto configuration server 415 to push and receive commands and data from the TR069 server 415. Policy client 445 may be a client which connects to the policy server 420 to receive and update policies.

STB policy database 460 may be a policy database maintained on the STB 435 to receive and update policies. Policy manager 465 may be configured to oversee policy management and which interfaces with other components to implement and update policies related to prevention of applications getting access to illegal/pirated content. As shown, policy manager 465 includes package monitoring module 480, application file monitoring/scan module 485, and piracy detection module 490.

In some embodiments, package-monitoring module 480 is configured to monitor all the applications/packages that are installed on the Android STB 435 and evaluates them. In some embodiments, application file monitoring/scan module 485 is configured to scan for creation of, and monitor, files in the files system for signatures related to add-ons which allow access to illegal content. In some embodiments, piracy detection module 490 is configured to detect and report various parameters related to playback of illegal/pirated content.

Package manager 450 may be an Android application responsible for authenticating and installing applications packages (APKs). In some embodiments, package manager 450 is a core android service which is responsible for installing, upgrading, configuring and removing the Android application packages (APKs). The package manager 450 unpacks the APK, reads the metadata for application which includes name, version and signature for authenticity, places the application files and its dependencies in the desired location on the Android file system. If another version of the APK already exists, the package manager 450 uninstalls, thereby removing the files associated with that version and replaces them with the files from the newer versions of the APK. USB/ADB 455 may be a USB port or Android debug bridge working on the Ethernet or Wi-Fi interface of the STB 435, and which allows wireless communication between STB 435 and the external servers 425, 430.

An app with illegal content 470, for example Kodi, is shown because it allows its add-ons to access illegal content. Add-on 475 is an additional piece of software or configuration which allows Kodi (or similar applications) to access Illegal/pirated content.

In some embodiments, STB 435 runs existing Android modules including the Android Package Manager 450, KODI 470 which is known to host add-ons 475, providing access to pirated content as well as policy manager 465, the auto configuration client 440, and policy client 445.

Google Play Store 425 hosts application packages (APKs) for approved applications including Kodi 470. The STB 435 user, however, can download APKs from third-party servers 430*b* and install them on the STB 435 using a USB drive 455.

There are other servers on the Internet which allow access to Kodi-add-ons which come in different forms: (1) APKs which are installed using the package manager 450 and (2) as archives (zip or other forms) which can be directly ingested into Kodi 470 without going though the package manager 450.

Figure 5:
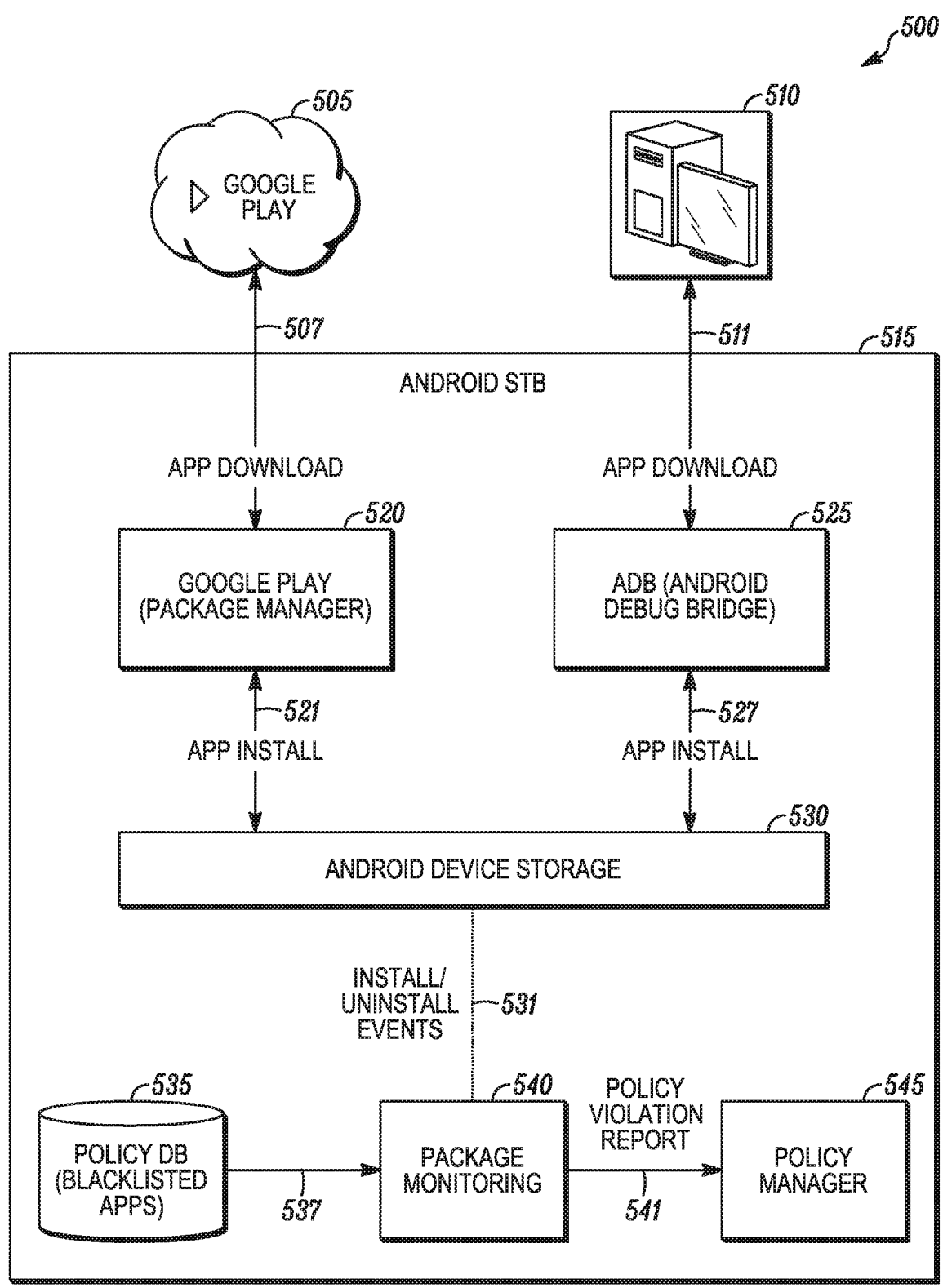
FIG. 5 illustrates a general flowchart for package monitoring.

FIG. 5 illustrates a general flowchart that provides a system and process 500 for package monitoring. System and process 500 includes components from Google Play store 505, optional personal computer/laptop 510, and STB 515. As provided above in reference to FIG. 3, Google Play store 505 is an online server used to download Android apps. Optional personal computer/laptop 510 may be used to connect to an Android device, such as STB 515, using ADB (Android Debug Bridge) software.

System and process 500 also includes Google play/package manager 520, ADB 525, storage device 530, policy database 535, package monitoring module 540, and policy manager module 545. Google play/package manager 520 may be an inbuilt application on an Android Platform which is used to download apps from online Google Play store 505. ADB 525 may be a software/service module running on the Android Platform.

At step 507, an app is downloaded and copied from the Google play store 505 to the package monitor 520. Alternately, or in addition, at step 511, an app is downloaded and copied from the personal computer/laptop 510 to ADB 525. It should be noted that at steps 507, 511, the apps are downloaded and copied onto any of Android device storage/disk/SD-Card from an external source.

At step 521, Android app/packages that have been downloaded into package monitor 520 are installed in Android system/application folders. Similarly, at step 527, Android app/packages that have been downloaded into ADB 525 are installed in Android system/application folders. These Android system/application folders from steps 521 and 527 may be stored on an Android Device storage 530.

At step 531, an install/uninstall event occurs, where an event/notification is sent regarding application installation/uninstallation. Step 531 is dependent upon one or more actions, as will be discussed below.

In some embodiments, the role of package monitoring module 540 is to monitor all the applications/packages that gets installed on the Android STB 515 and evaluate them. Applications could be installed from directly from the Google Play store 505 using the Android inbuilt package manager 520 or using the ADB 525 using any desktop/laptop 510 or using an external USB connected drive (not shown). The package-monitoring module 540 may monitor all the packages installation/uninstallation 521, 527 onto the Android Device storage 530.

On each install/Un-install event 531 sent to package-monitoring module 540 by Android platform (e.g., Android Device storage 530), the package-monitoring module 540 reads the policy database 535 and evaluates the app getting installed. Policy database 535 may include the policies/names of the blacklisted app/packages. Such apps/packages may be determined to be blacklisted based on pre-existing knowledge that the package/app is known to be used to steal content or view stolen content, or based on intelligence (860) gathered from a piracy detection module, as described later in FIG. 7.

In case the package-monitoring module 540 finds a policy violation, such as a known nefarious APK is installed, the package-monitoring module 540 may report this violation event at step 541 to the policy manager module 545. Policy manager module 545 may be a module for policy management which interfaces with other components to implement and update policies related to prevention of applications getting access to illegal/pirated content.

In some embodiments, package-monitoring module 540 is a software module that, on every Install/Uninstall event 521, reads the information about the app/package getting installed/un-installed then verifies that information in the policy database 535. Package monitoring module 540 may be responsible for sending a policy violation report at step 541 to policy manager module 545.

Figure 6:
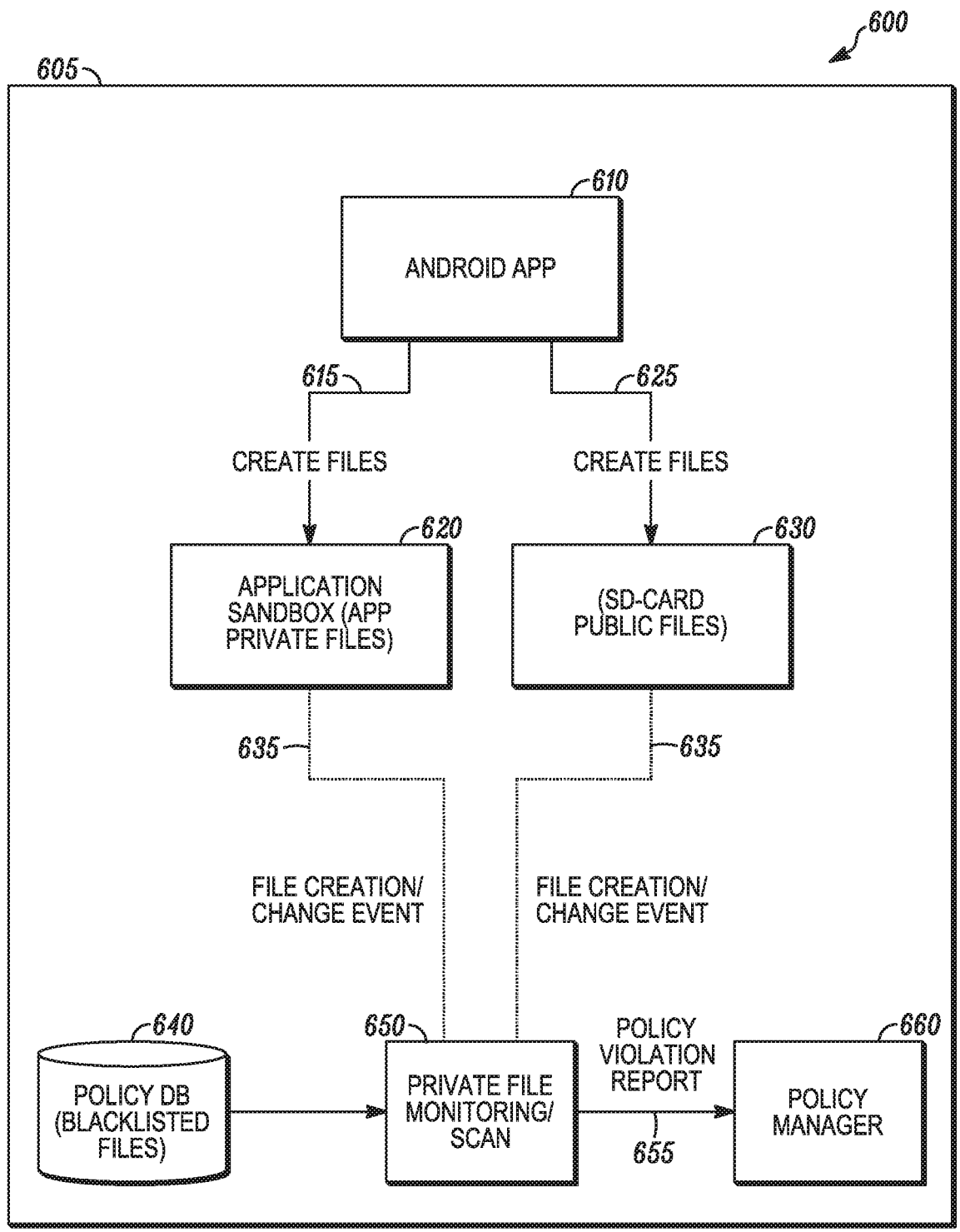
FIG. 6 illustrates a general flowchart for private file/l private file scan monitoring.

FIG. 6 illustrates a general flowchart that provides a system and process 600 for private file monitoring. As shown, system and process 600 occurs wholly within STB 605 and includes an Android app 610, an application sandbox 620, an SD-card 630, policy database 640, private file monitoring/scan module 650, and policy manager module 660. Android app 610 may be an Android application running on Android device memory such as Kodi. In some embodiments, the data gathered from the STB 605 may be transmitted to a remote server for analysis, so it is not necessary that the entire process occurs on the STB 605.

Application sandbox 620 may be a private file/folder storage/disk area (on the Android device storage) reserved per application. For each application there may be a different sandbox area. SD-card 630 may be a public file/folder storage/disk area which all the applications can see/read/write. In some embodiments, an Android application creates/modifies files at step 615 in its private file area (Application sandbox 620) or creates/modifies files at step 625 on the public shared area (SD-Card 630 or device internal storage).

Policy database 640 may be contain the policies/names of blacklisted app/packages. As used herein, blacklisted refers to a defined list of applications or packages which are known to used to steal content or view stolen content. Such apps/packages may be blacklisted according to any methods described within this present disclosure.

Private file monitoring/scan module 650 may monitor file creation/change events and verify file names with the policy database 640. Private file monitoring/scan module 650 may be responsible for sending a policy violation report 655, which is a report of one or more policy violations, to policy manager module 660. Policy manager module 660 may interface with other components to implement and update policies related to prevention of applications getting access to illegal/pirated content.

In some embodiments, private file monitoring/scan module 650 monitors the private file area (application sandbox 620) of that application and monitor the shared area (SD-card 630) and determines if the running application creates or modifies any file at step 635. On each file creation/change event at step 635, the private file monitoring/scan module 650 reads the policy database 640 and validates the complete path and the name of that file. If the file path or the name contains any keyword which matches a known nefarious add-on or application (e.g., a blacklisted app or package), then the private file monitoring/scan module 650 reports this violation via a policy violation report 655 to policy manager module 660.

Figure 7:
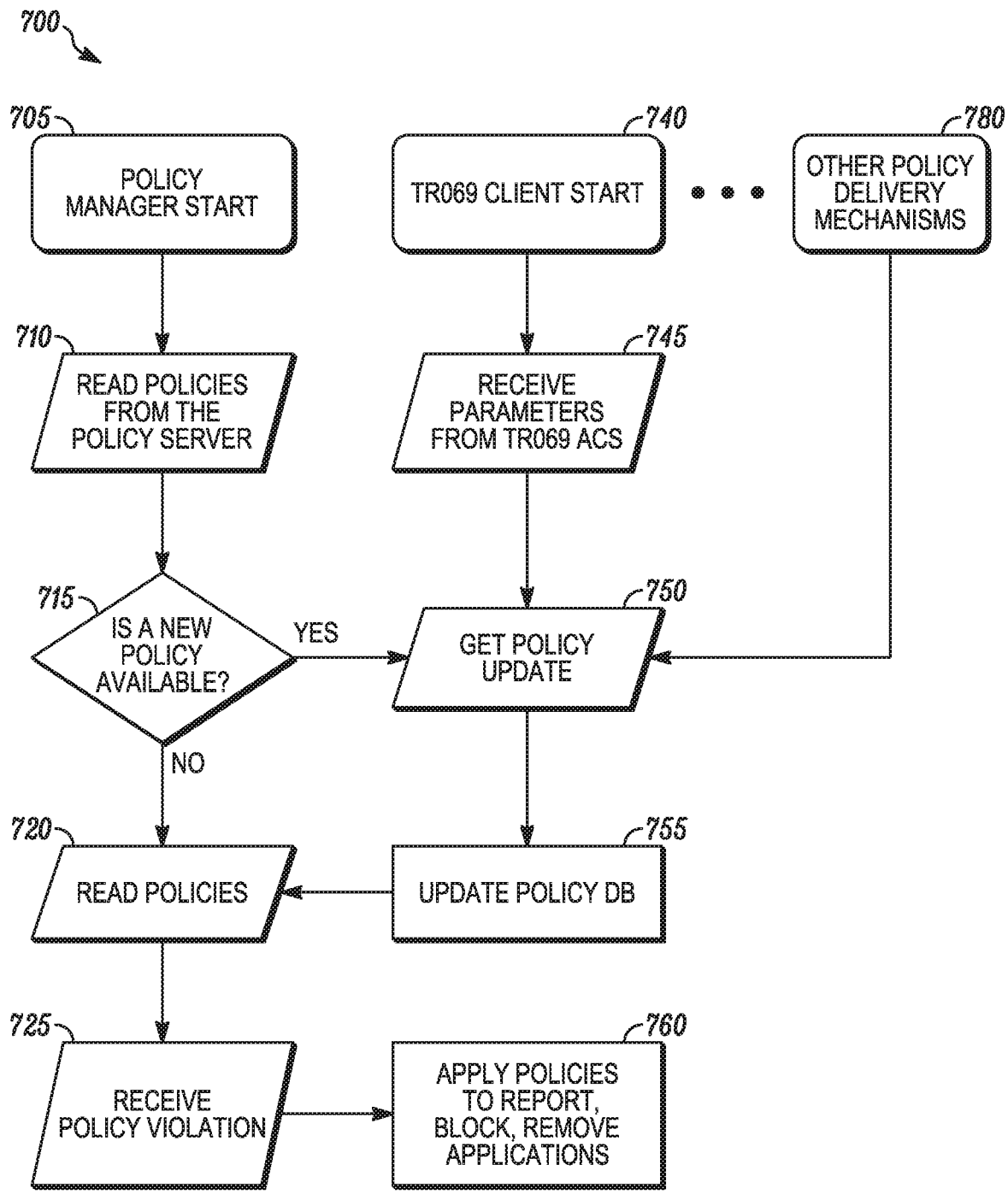
FIG. 7 illustrates a general flowchart for intelligent piracy detection.

FIG. 7 illustrates a general flowchart for an intelligent piracy detection process 700. At step 705, a policy manager is launched on an Android STB. It should be appreciated that any android application or service which is not part of the core Android system needs to be launched either manually or using a initiation script which runs automatically at STB boot. In this case, the policy manager may be launched automatically at bootup so that it is always running and does not need a user action to initiate. At step 710, the policy manager retrieves policies using, e.g., the policy client. At step 715, the policy manager determines if there are new policies to implement.

In some embodiments, at step 740, an auto configuration client is launched on the Android STB. At step 745, the auto configuration client receives new policies or parameters from an auto configuration server. Examples of an auto configuration client and an auto configuration server are provided in the discussion of FIG. 4. In some embodiments, the package manager interacts with an auto configuration client and an auto configuration server to get the policies related to detection of nefarious applications or add-ons which enable access to illegal/pirated content.

In some embodiments, at step 780, additional or other policy applications are launched or provided via other delivery mechanism. Such policy applications/delivery mechanisms are provided in more detail in the discussion of FIG. 4.

Returning to step 715, if one or more new policies are available, the policy manager retrieves the new policies or policy updates at step 750. The new policies may be provided via auto configuration client or other delivery mechanisms.

At step 755, the policy manager parses the new policies to update the local policy database at step 755. At step 720, the policy manager reads policies from the policy database. If there was not a new policy available of policy update, the policy manager would have gone directly to step 720 after step 715.

At step 725, policy manager receives a policy violation from a component. At step 760, policy manager applies the policies and takes necessary action as defined by the policy. The policy manager may receive policy violation inputs from a package monitoring module, application file scan/monitoring module and piracy detection module and then takes actions on the apps/add-ons based on policies set by e.g., the MSO. In some embodiments, policy violations may include installation of package or add-ons which are known to be used to steal content or view stolen content.

Figure 8:
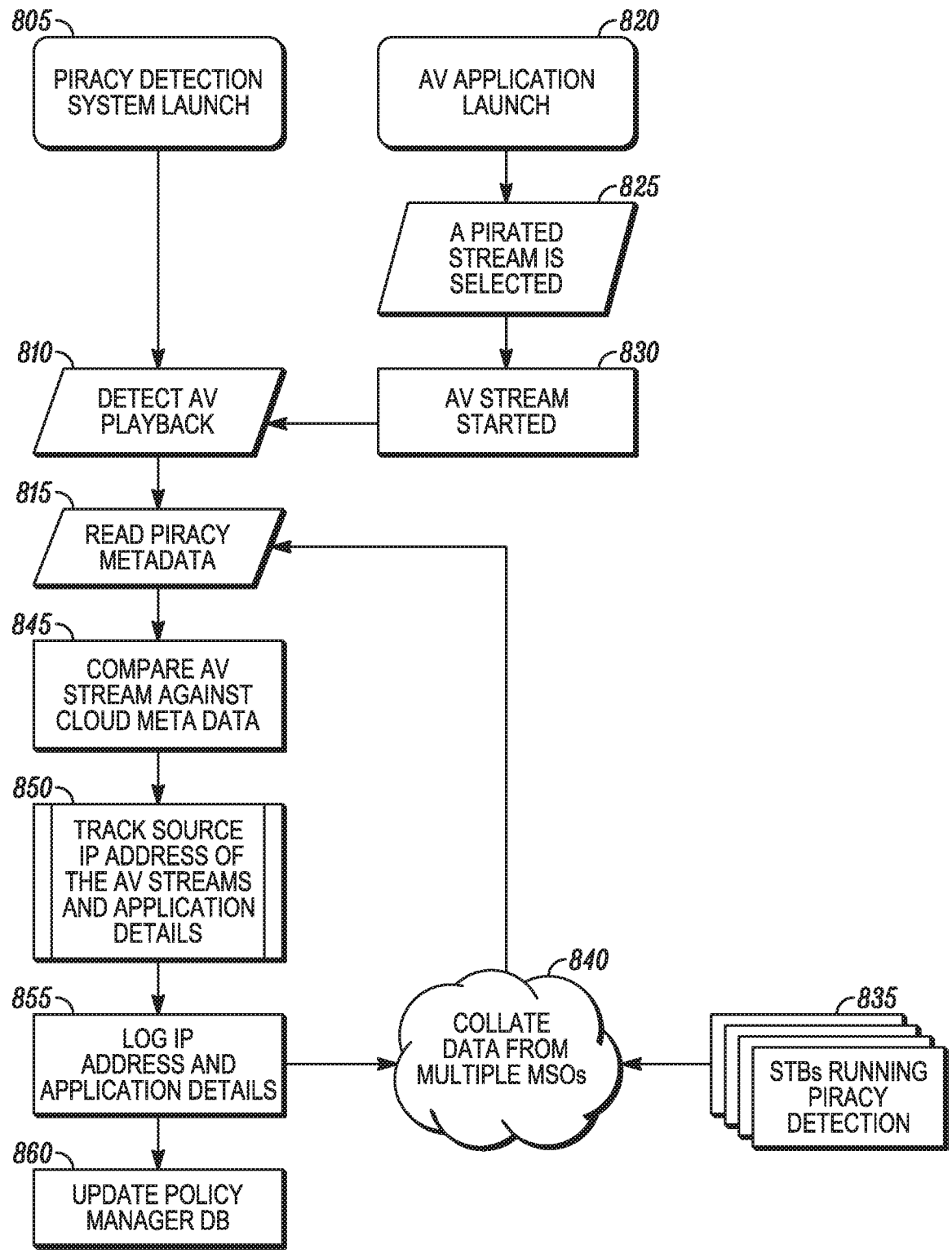
FIG. 8 illustrates a general flowchart for policy management.

FIG. 8 illustrates a general flowchart for a policy management process 800. At step 805, an intelligent piracy detection module is launched. At step 810, the piracy detection module detects that audio/video (AV) streaming has started. In some embodiments, the piracy detection module detects that audio/video (AV) streaming has started by monitoring the audio video decoders and looking for decoder start event. For example, a vendor, e.g. Broadcom, may provide access to the status of the audio video decoders via custom software.

In some embodiments, at step 820, a AV application such as Kodi or another application with access to illegal content is launched. At step 825, the application selects illegal content and at step 830, the application starts playing the illegal content.

At step 815, the piracy detection module reads identifiers in the illegal content, such as piracy metadata. In some embodiments, the piracy metadata (e.g. Source IP address of the stream) is read from the cloud (805) and not the content stream. At step 845, the piracy detection module compares the AV streaming parameters against the available policy and metadata, such as source IP address, server domain name etc.

Meanwhile, in some embodiments, at step 835, STBs running the piracy detection module all log to a policy database. At step 840, the piracy detection module updates a backend policy database 410. This update may be performed by collating data from one or more MSOs. Because STBs are deployed by multiple MSOs, in some embodiments, it makes sense to collate data from all MSOs rather than a single operator. For example, if a pirated content server X in Mexico is hosting pirated content and is being streamed to a STB deployed by Verizon in the USA, the data related to X can be shared with Bell in Canada, so that if an STB deployed by Bell starts streaming from server X it amounts to a policy violation.

At step 850, the piracy detection module determines that the AV stream being played may be illegal and therefore tracks the application name, its add-ons, its file system details and the source details such as IP address and DNS of the AV source server. In some embodiments, the data may come from an in-home router, in combination with the data received from the player playing the stream.

At step 855, the piracy detection module logs all the data related to the application and the server. In some embodiments, the application information includes application name, its add-ons, its private file structure including directories and file names. The server information may include server name (DNS) and WAN IP address. A stream playing from a known illegal source or a known illegal add-on may be considered a violation. At step 860, the piracy detection module updates the policy manager database with information on the application name, its add-ons, private file structure such as directories and file names, the source ip address and dns of the server streaming the content, etc.

In some embodiments, the intelligent piracy detection module is responsible for detecting (e.g., at step 810) and reporting various parameters (e.g., at step 855) related to playback (e.g., at steps 815, 830) of illegal/pirated content (e.g., at step 825) such as source IP address of the AV servers, the applications which are running at the time and application add-ons and directory structure. The intelligent piracy detection module may read data collated from all MSOs (e.g., at step 840) and compare the parameters of the AV stream against known legal and illegal sources (e.g., at step 845). If a source for illegal/pirated stream is detected it may report the violation to the policy manager (e.g., at step 860).

It should be appreciated that current solutions exist that block undesirable applications from being installed on an AndroidTV STB. However, blanket blocking undesirable applications violates Google policy. The present disclosure, in contrast, may implement policies agreed upon between the operator and Google to deal with undesirable applications. The policies may include presenting a warning message each time the application is launched, presenting a persistent banner on the TV screen, partially blocking AV content, etc.

It should be understood that the various system components can be implemented as physical devices. Alternatively, the system components can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory of a computer. As such, system components (including associated data structures and methods employed within the system components) can be stored on a computer readable medium or carrier, e.g., RAM memory, magnetic or optical drive or diskette and the like.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine-readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

While the foregoing is directed to embodiments of the present invention, other and further embodiments of the invention may be devised without departing from the basic scope thereof, and the scope thereof is determined by the claims that follow.

What is claimed is:

1. A method of determining whether to allow an application (app) installed on a set top box (STB) for use or restrict the app running on the STB, the method comprising:
monitoring at the STB, the installed app by comparing the installed app against a policy database, wherein the comparing includes:
measuring at the STB, one or more STB or STB network utilization resources used by the app running on the STB;
comparing at the STB, the one or more STB or STB network utilization resource thresholds set by an operator to the one or more STB or STB network utilization resources used by the app running on the STB, wherein the one or more STB or STB network utilization resource thresholds are set based on a potential security threat posed by the app; and
determining if the one or more STB or STB network utilization resources used by the app running on the STB exceed one or more thresholds set by the operator.

2. The method of claim 1, wherein the STB comprises a policy manager module and the policy manager module performs the measuring, comparing and determining steps.

3. The method of claim 2, wherein if one or more STB or STB network utilization resource thresholds is exceeded by the app, the policy manager module shuts down the app.

4. The method of claim 2, wherein if one or more STB or STB network resource thresholds is exceeded by the app, the policy manager module limits usage of the app to the one or more thresholds.

5. The method of claim 4 wherein limiting the usage of the app to the one or more STB or STB network utilization resource thresholds includes one of: changing the output display resolution of the STB for the app.

6. The method of claim 2, wherein if one or more STB or STB network utilization resource thresholds is exceeded by the app, the policy manager module pauses execution of the application for a predetermined time period.

7. The method of claim 2, wherein if one or more STB or STB network utilization resource thresholds is exceeded by the app, the policy manager module displays a notification to a user of excessive resources used by the app.

8. The method of claim 1, wherein the one or more STB or STB network utilization resources comprise upstream bandwidth, downstream bandwidth, memory on platform (RAM), memory on platform (FLASH), CPU utilization, display resolution (HD or SD).

9. The method of claim 1, wherein the operator sets the one or more STB or STB network utilization resource thresholds on a policy server that is separate from the STB.

10. The method of claim 1, wherein the comparing at the STB, one or more STB or STB network utilization resource thresholds set by an operator includes:
comparing at the STB the app to a list of applications, the list indicating the one or more STB or STB network utilization resource thresholds set by the operator for each of the applications in the list; and
determining the app is included in the list of applications.

11. The method of claim 1, wherein the security threat posed by the app is one of pirated content and exposure of sensitive consumer data.

12. The method of claim 1, wherein the app is an Android application.

13. A system for determining whether to allow an application (app) installed on a set top box (STB) for use or restrict the app running on the STB, the system comprising: one or more processors, one or more computer-readable memories, one or more computer-readable tangible storage devices, and instructions stored on at least one of the one or more storage devices for execution by at least one of the one or more processors via at least one of the one or more memories, the instructions comprising:
instructions to monitor at the STB, the installed app by comparing the installed app against a policy database, wherein the comparing includes:
instructions to measure at the STB, one or more STB or STB network utilization resources used by the app running on the STB;
instructions to compare at the STB, one or more STB or STB network utilization resource thresholds set by an operator, to the one or more STB or STB network utilization resources used by the app running on the STB, wherein the-one or more STB or STB network utilization resource thresholds are set based on a potential security threat posed by the app; and
instructions to determine if the one or more STB or STB network utilization resources used by the app running on the STB exceed one or more thresholds set by the operator.

14. The system of claim 13, wherein the STB comprises a policy manager module and the policy manager module performs the measuring, comparing and determining steps.

15. The system of claim 14, wherein if one or more STB or STB network utilization resource thresholds is exceeded by the app, the policy manager module shuts down the app.

16. The system of claim 14, wherein if one or more STB or STB network utilization resource thresholds is exceeded by the app, the policy manager module limits usage of the app to the one or more thresholds.

17. The system of claim 16 wherein limiting the usage of the app to the one or more STB or STB network utilization resource thresholds includes one of: changing the output display resolution of the STB for the app.

18. The system of claim 14, wherein if one or more STB or STB network utilization resource thresholds is exceeded by the app, the policy manager module pauses execution of the application for a predetermined time period.

19. The system of claim 14, wherein if one or more STB or STB network utilization resource thresholds is exceeded by the app, the policy manager module displays a notification to a user of excessive resources used by the app.

20. The system of claim 13, wherein the one or more STB or STB network utilization resources comprise upstream bandwidth, downstream bandwidth, memory on platform (RAM), memory on platform (FLASH), CPU utilization, display resolution (HD or SD).

21. The system of claim 13, wherein the operator sets the one or more STB or STB utilization resource thresholds on a policy server that is separate from the STB.

22. The system of claim 13, wherein the instructions to compare at the STB, one or more STB or STB network utilization resource thresholds set by an operator includes:
instructions to compare at the STB the app to a list of applications, the list indicating the one or more STB or STB network utilization resource thresholds set by the operator for each of the applications in the list; and
instructions to determine the app is included in the list of application.

* * * * *